United States Patent
Song et al.

(10) Patent No.: US 7,804,497 B2
(45) Date of Patent: Sep. 28, 2010

(54) DISPLAY DRIVING CIRCUIT, DISPLAY DEVICE, DISPLAY SYSTEM AND METHOD OF DRIVING DISPLAY DEVICES

(75) Inventors: Min-Seok Song, Seoul (KR); Jong-Seon Kim, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 758 days.

(21) Appl. No.: 11/513,299

(22) Filed: Aug. 30, 2006

(65) Prior Publication Data
US 2007/0057865 A1 Mar. 15, 2007

(30) Foreign Application Priority Data
Sep. 12, 2005 (KR) ............ 10-2005-0084695

(51) Int. Cl.
*G09G 5/00* (2006.01)
(52) U.S. Cl. ............ 345/204; 345/95; 345/55
(58) Field of Classification Search ........... 345/204, 345/95, 55
See application file for complete search history.

(56) References Cited

U.S. PATENT DOCUMENTS

| | | | | |
|---|---|---|---|---|
| 6,760,772 | B2 | 7/2004 | Zou et al. | 709/230 |
| 6,989,827 | B2 * | 1/2006 | Myers | 345/204 |
| 2005/0146494 | A1 * | 7/2005 | Aoki et al. | 345/95 |

FOREIGN PATENT DOCUMENTS

| | | |
|---|---|---|
| JP | 2004-061892 | 2/2004 |
| KR | 1020040073948 | 8/2004 |
| KR | 102004040107124 | 12/2004 |

* cited by examiner

*Primary Examiner*—Richard Hjerpe
*Assistant Examiner*—Leonid Shapiro
(74) *Attorney, Agent, or Firm*—F. Chau & Associates, LLC

(57) ABSTRACT

A display driving circuit includes a first interface unit, a signal discriminating circuit, a signal distributing circuit, a driver logic circuit and a synchronization processing unit. The first interface unit receives a first signal through a first interface from a host. The signal discriminating circuit discriminates whether the first signal corresponds to a first video signal or a second video signal. The signal distributing circuit divides the first signal into the first and second video signals based on a discrimination result of the signal discriminating circuit. The driver logic circuit drives a first display panel based on the first video signal. The second interface unit converts the second video signal into a second signal and provides the second signal through a second interface to an external display device. The synchronization processing unit receives a synchronization signal from the external display device and provides the synchronization signal to the host.

2 Claims, 13 Drawing Sheets

MPU I/F

DISPLAY DRIVING CIRCUIT, DISPLAY DEVICE, DISPLAY SYSTEM AND METHOD OF DRIVING DISPLAY DEVICES

CROSS-REFERENCE TO RELATED PATENT APPLICATION

This application claims priority to Korean Patent Application No. 2005-84695, filed on Sep. 12, 2005, the contents of which are herein incorporated by reference in their entirety.

BACKGROUND OF THE INVENTION

1. Technical Field

The present disclosure relates to display devices and, more particularly, to display driving circuits, display devices, display systems and methods of driving display devices for a multi-display system.

2. Discussion of Related Art

A display device comprising a dual display format includes a main display panel and a sub-display panel. The sub-display panel displays a relatively small amount of information compared to the main display panel.

In the case of a folder type mobile phone, the main display panel, which is located inside of a folder cover, functions to display a phone number while dialing or an elapsed time of a phone call, etc. The sub display panel, which can be located in the outer side of the folder cover, functions to indicate information including signal reception strength during a stand-by mode, a clock, remaining battery power, etc.

A dual display structure offers improved functionality and convenience. However, problems may occur in an interface between a central processing unit (CPU) and a driving circuit for driving each of the display panels.

FIG. 1 is a block diagram illustrating a conventional dual display system.

Referring to FIG. 1, the conventional dual display system includes a first display panel 101, a first display driving circuit 102 for driving the first display panel 101, a second display panel 103, a second display driving circuit 104 for driving the second display panel 103 and a host 105.

As shown in FIG. 1, the first display driving circuit 102 is coupled to the host 105 via a first interface link represented by signal line 106, and the second display driving circuit 104 is coupled to the host 105 via a second interface link represented by signal line 107.

The host 105 provides video signals and control signals to the display driving circuits 102 and 104, and may be a type of processor. For example, the functions of the host may be performed by a base-band processor of a mobile phone. Alternatively, the functions of the host may be performed by another application processor.

In a system having a plurality of display driving circuits, the processor and the display driving circuits, which may be implemented as an integrated circuit (IC), and are connected to each other via a plurality of wires on a printed circuit board (PCB). As the number of the display driving circuits is increased, the wiring complexity between the processor and the display driving circuits is increased and electromagnetic interference (EMI) characteristics may be deteriorated.

Recently introduced mobile phones may include a display for displaying high-resolution video, or real-time images received from a built-in camera. Accordingly, data throughputs that the processor has to process have been increased, causing more severe EMI problems.

Compared to conventional parallel data transfer between the processor and the display driver IC, differential serial data transfer provides a high data transfer rate, low EMI and reduced wiring complexity. For example, display driver IC chips may incorporate Qualcomm's mobile digital display interface (MDDI) standard. According to the MDDI standard, data can be transferred between the processor, for example, the base-band processor of the mobile phone, and the display driver IC using a serial differential data transfer method.

The MDDI standard addresses at least four types of interfaces found in the communications and computer industries. These are labeled simply as type 1, type 2, type 3, and type 4. In the case of type 1, data may be transferred with a maximum data transferring rate of 400 megabits per second, and in the case of type 4, data may be transferred at a maximum data transferring rate of 3.2 gigabits per second. The connection wires between the baseband processor and the display driver IC may be reduced by applying the MDDI standard. For example, the number of wires connected between the baseband modem chip and the display driver IC may be reduced to about a tenth of the conventional 30~40 wires.

Pixel data and control signals may be transferred through an MDDI interface or an 80-mode interface; however, the MDDI interface and the 80-mode interface may not transfer a video synchronization signal, or may have difficulty in transferring the video synchronization signal. When the interface is a unilateral interface, there may be a tearing effect that degrades the video image displayed on the sub-display panel when the synchronization signal of the sub-display panel is not sent to the main display panel. Generally, it is required that the synchronization signal of the sub-display panel is sent to the main display panel to prevent the tearing effect.

The conventional multi-display device may include a first display driver IC, which supports the MDDI interface, and a second display driver IC, which supports the parallel data transfer interface. For example, the display driver IC for driving the main display panel supports the MDDI interface, whereas the display driver IC for driving the sub-display panel supports the conventional parallel data transfer interface. Thus, in the conventional dual display system, the complexity of the wiring and the EMI characteristics may not be effectively improved when the first display driver IC adopts the serial differential interface.

SUMMARY OF THE INVENTION

In an exemplary embodiment of the present invention, a display driving circuit includes: a first interface unit configured to receive a first signal through a first interface from a host; a signal discriminating circuit configured to discriminate whether the first signal corresponds to a first video signal or a second video signal; a signal distributing circuit configured to divide the first signal into the first video signal and the second video signal based on a discrimination result of the signal discriminating circuit; a driver logic circuit configured to drive a first display panel based on the first video signal; a second interface unit configured to convert the second video signal into a second signal and provide the second signal through a second interface to an external display device; and a synchronization processing unit configured to receive a synchronization signal from the external display device to provide the synchronization signal to the host.

In an exemplary embodiment of the present invention, a display device includes: a display panel; a first interface unit configured to receive a first signal through a first interface from a host; a signal discriminating circuit configured to discriminate whether the first signal corresponds to a first video signal or a second video signal; a signal distributing circuit configured to divide the first signal into the first video signal and the second video signal based on a discrimination result of the signal discriminating circuit; a driver logic circuit configured to drive the display panel based on the first video signal; a second interface unit configured to convert the second video signal into a second signal and provide the second signal through a second interface to an external display device; and a synchronization processing unit configured to receive a synchronization signal from the external display device to provide the synchronization signal to the host.

In an exemplary embodiment of the present invention, a display system includes a first display device, a second display device, and a host that provides a first video signal for the first display device and a second video signal for the second display device through a first interface. The first display device receives the first and the second video signals from the host, displays a first video image based on the first video signal, and provides the second video signal through a second interface to the second display device. The second display device transmits a synchronization signal to the first display device, and displays a second video image based on the second video signal. The host receives the synchronization signal from the first display device and provides the second display signal in response to the synchronization signal.

In an exemplary embodiment of the present invention, a method of driving a plurality of display devices includes: receiving first and second video signals, which are transmitted from a host through a first interface to a first display device; discriminating the first video signal from the second video signal by the first display device; displaying a first video image using the first display device based on the first video signal; transmitting the second video signal from the first display device through a second interface to a second display device; displaying a second video image using the second display device based on the second video signal; and transmitting a synchronization signal from the second display device to the first display device, wherein the second video signal transmitted from the host is provided to the first display device in response to the synchronization signal.

In an exemplary embodiment of the present invention, a display system includes: a first display device; a second display device; and a host that provides a first video signal for the first display device and a second video signal for the second display device through a first interface to the first display device. The first display device receives the first and the second video signals from the host, displays a first video image based on the first video signal, and provides the second video signal through a second interface to the second display device. The second display device transmits a synchronization signal to the host, and displays a second video image based on the second video signal. The host provides the second display signal in response to the synchronization signal.

In an exemplary embodiment of the present invention, a method of driving a plurality of display devices includes: receiving first and second video signals, which are transmitted from a host through a first interface to a first display device; discriminating the first video signal from the second video signal using the first display device; displaying a first video image using the first display device based on the first video signal; transmitting the second video signal from the first display device through a second interface to a second display device; displaying a second video image using the second display device based on the second video signal; and transmitting a synchronization signal to the host using the second display device, wherein the second video signal transmitted from the host is provided to the first display device in response to the synchronization signal.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
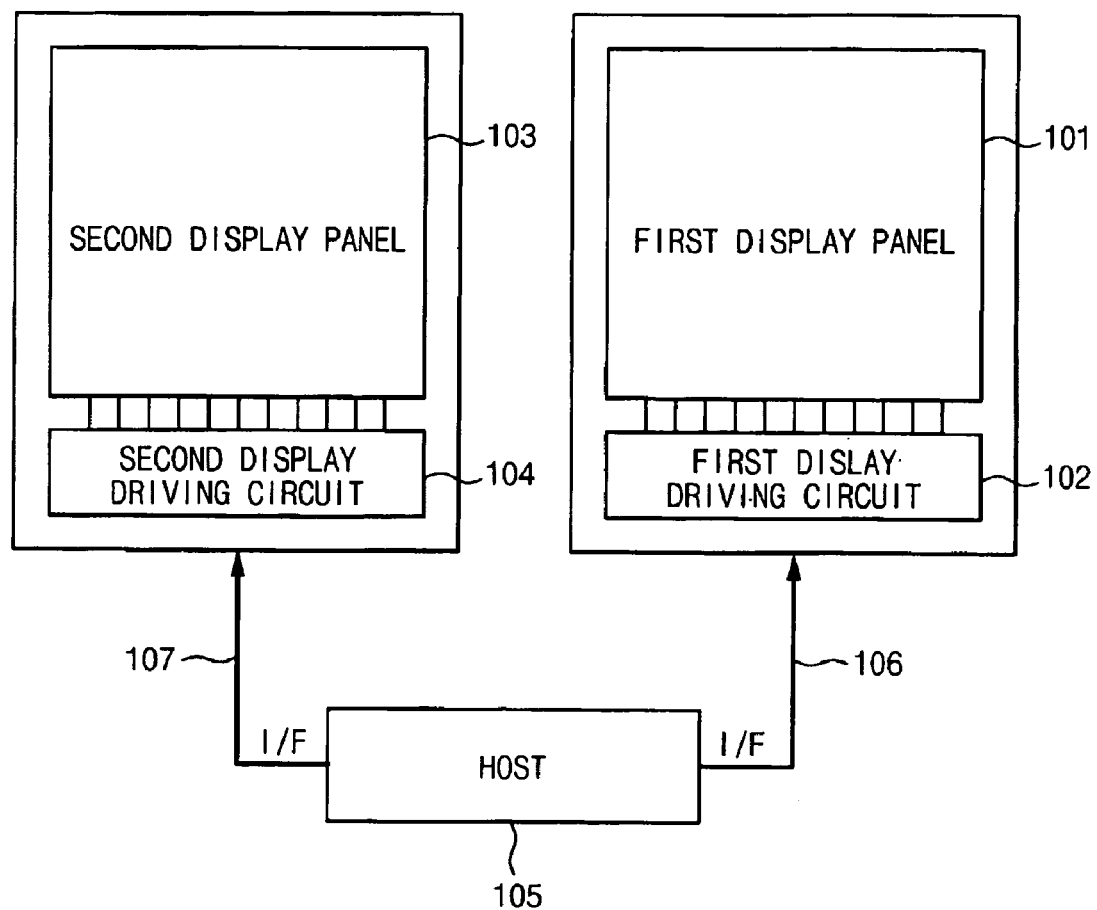
FIG. 1 is a block diagram illustrating a conventional display system.

Hereinafter, exemplary embodiments of the present invention will be described with reference to the accompanying drawings. Like reference numerals refer to similar or identical elements throughout the description of the figures.

Figure 2:
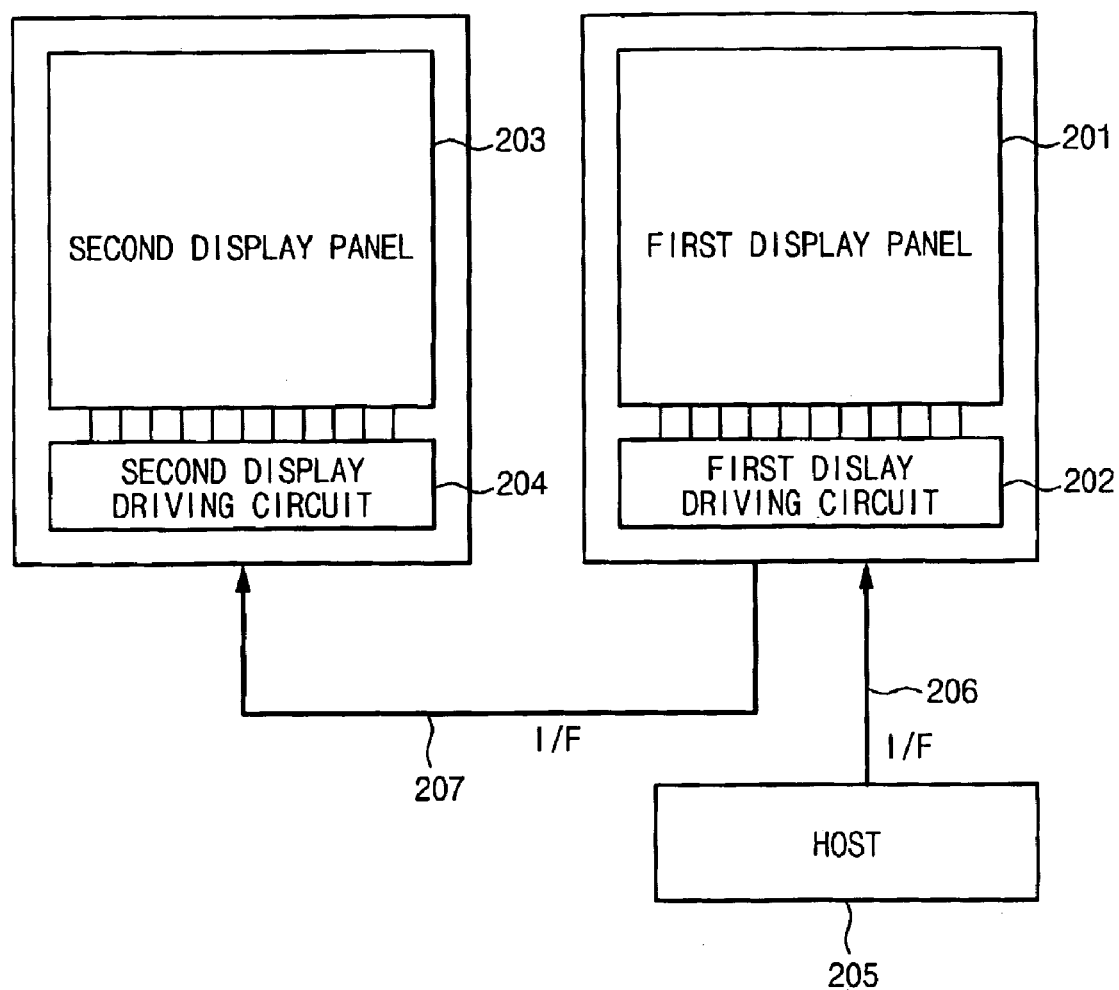
FIG. 2 is a block diagram illustrating a display system according to an exemplary embodiment of the present invention.

FIG. 2 is a block diagram illustrating a display system according to an exemplary embodiment of the present invention.

Referring to FIG. 2, the display system includes a first display panel 201, a first display driving circuit 202 for driving the first display panel 201, a second display panel 203, a second display driving circuit 204 for driving the second display panel 203 and a host 205. In a case when the display system is a mobile phone, the host 205 may be a base-band modem chip, such as for example, a mobile station modem (MSM) chip of Qualcomm, Inc., or another micro processing unit (MCU).

The first display driving circuit 202 may interface with two or more interfaces links represented by signal lines 206 and 207. The first display driving circuit 202 receives a first signal, which may include a first video signal and a second video signal, through a first interface link represented by signal line 206, and discriminates whether the first signal corresponds to the first video signal or the second video signal. The first display driving circuit 202 drives the first display panel 201 in response to the first video signal, and transfers the second video signal to the second display driving circuit 204 through the second interface link represented by signal line 207.

The first interface 206 may be implemented with a serial differential interface and wiring complexity may be reduced and EMI characteristics may be enhanced. The differential interface may be a packet type interface. When the differential interface is the packet type interface, a packet having the first video signal and a packet having the second video signal may be substantially simultaneously transmitted. For example, the serial differential interface may be a mobile digital display interface (MDDI). The MDDI is one of the packet type interfaces that receives/transmits a signal through a serial differential signal line. The details of the MDDI packet interface are disclosed in U.S. Pat. No. 6,760,772. Qualcomm, Inc. is the assignee of U.S. Pat. No. 6,760,772.

When the MDDI interface is employed, the first display driving circuit may include an element defined as an MDDI client according to the MDDI standard. Thus, the host may selectively transmit one of the first and the second video signals to the first display driving circuit 202 via the MDDI interface. The host may substantially simultaneously transmit the first and the second video signals to the first display driving circuit 202 via the MDDI interface.

The first display driving circuit 202 transmits the second video signal via the second interface link represented by signal line 207 to another display device. For example, the second interface link represented by signal line 207 may be a parallel interface. The sub-display panel may include a display panel having lower resolution and smaller color depth than the main display panel. The second interface link represented by signal line 207 corresponding to the sub-display panel may be a parallel interface such as a micro processor unit (MCU) interface. For example, the MCU interface may be an 80-mode parallel interface, or a Motorola 68000 series interface. The second interface 207 may be a parallel interface having a low speed compared with the first interface 206, or the second interface 207 may be an interface equivalent to or superior to the first interface 206. The second display driving circuit 204 receives the second video signal and drives the second display panel 203 based on the second video signal.

The first and second video signals, which are included in the signals that are transmitted to the first display driving circuit 202 from the host 205 through the first interface link represented by signal line 206, are respectively outputted as video image via the first and second display panels 201 and 203. The first and second video signals include pixel data and control signals for driving the first and second display panels 201 and 203, respectively. The display system according to the exemplary embodiment of the present invention as described in connection with FIG. 2 has reduced wiring complexity and enhanced EMI characteristics compared with the conventional display system as shown in FIG. 1.

The pixel data and the control signals may be transferred through the MDDI interface or the 80-mode interface. A display system including a plurality of display panels capable of reducing the tearing effect will be described later in this disclosure. In an exemplary embodiment of the present invention, the first interface is the MDDI interface and the second interface is the microprocessor unit (MPU) interface.

Figure 3:
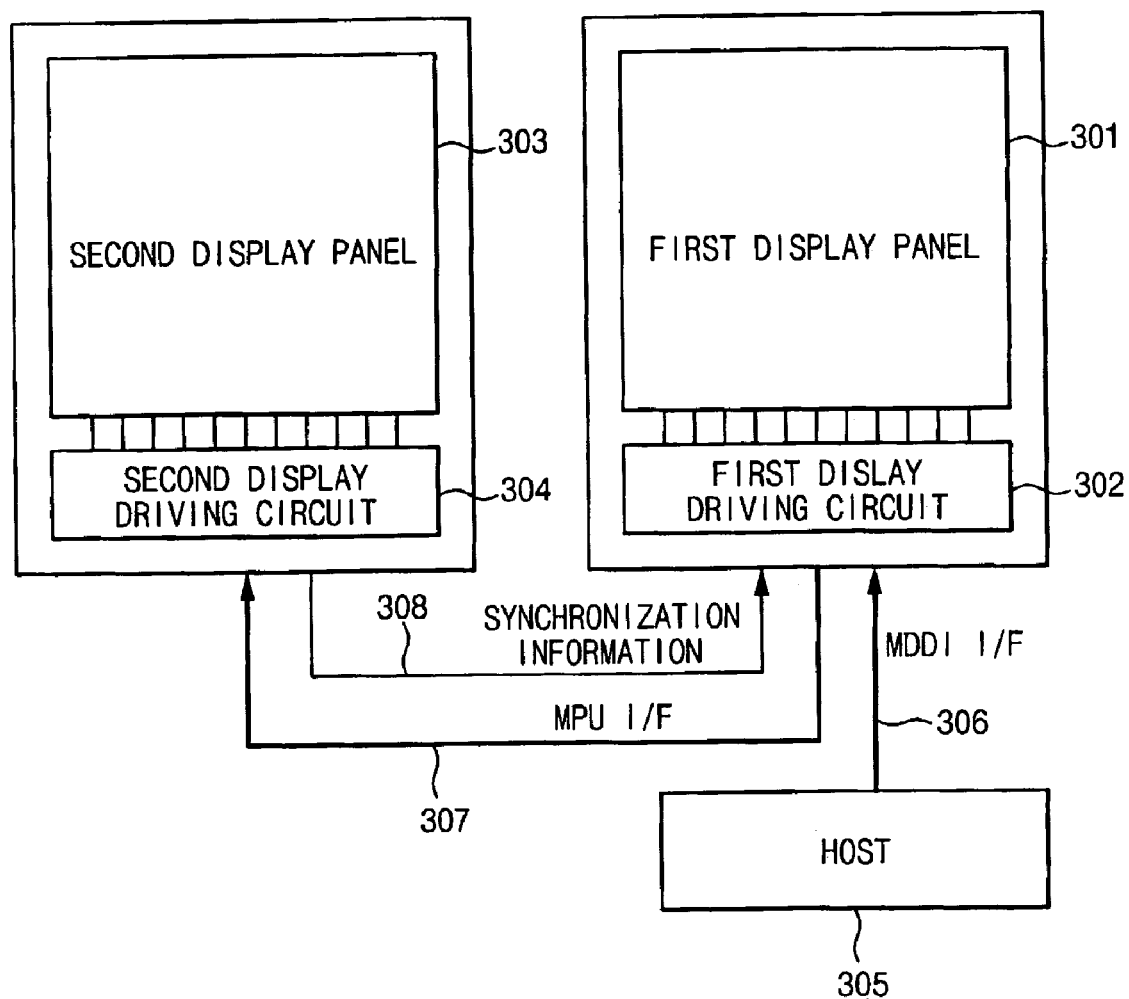
FIG. 3 is a block diagram illustrating a display system according to another exemplary embodiment of the present invention.

FIG. 3 is a block diagram illustrating a display system according to an exemplary embodiment of the present invention.

Referring to FIG. 3, the display system includes a first display panel 301, a first display driving circuit 302 for driving the first display panel 301, a second display panel 303, a second display driving circuit 304 for driving the second display panel 303 and a host 305. Operations of the display system are explained below.

The host transmits the first and the second video signals through the MDDI interface link represented by signal line 306 to the first display driving circuit 302. The first display driving circuit 302 discriminates the first video signal from the second video signal, and drives the first display panel 301 based on the first video signal. The first display panel displays the video image that is transferred thereto based on the first video signal. The first display driving circuit 302 transmits the second video signal through the MPU interface link represented by signal line 307 to the second display driving circuit 304.

The second display driving circuit 304 drives the second display panel 303 based on the second video signal. The second display panel 303 displays the video image transmitted based on the second video signal. In addition, the second display driving circuit 304 transmits a synchronization signal to the first display driving circuit 302 to inform a time point when the second video signal is transmitted to the second display panel 303. The synchronization signal may be transferred via a synchronization line 308 as shown in FIG. 3. However, the synchronization signal may be transferred to the first display driving circuit 302 via an MPU interface represented by signal line 307.

The first display driving circuit 302 checks whether the host 305 is in a sleep mode or standby mode when the first display driving circuit 302 receives the synchronization signal. The first display driving circuit 302 wakes up the host when the host 305 is in the sleep mode. In the MDDI, a host or a client enters the sleep mode to reduce power consumption when command or video data are not being transmitted. In the sleep mode, the high speed transmitter/receiver is turned off, and only a low speed receiver that senses a signal for waking up a communication link is turned on.

The first display driving circuit 302 wakes up the host 305 from the sleep mode when a display of a frame image is completed and a new frame data are required. The host 305 determines whether the signal for waking up the communication link is a request for the new video data, and provides the first video signal to the first display driving circuit 302.

The second display driving circuit 304 transmits the synchronization signal to the first display driving circuit 302 when the new video data are required, and the first display driving circuit 302 wakes up the host 305 from the sleep mode. The host 305 transmits the second video signal to the first display driving circuit 302, and the first display driving circuit 302 transmits the second video signal to the second display driving circuit 304. Procedures for transmitting the second video signal will be described later in this disclosure.

Figure 4:
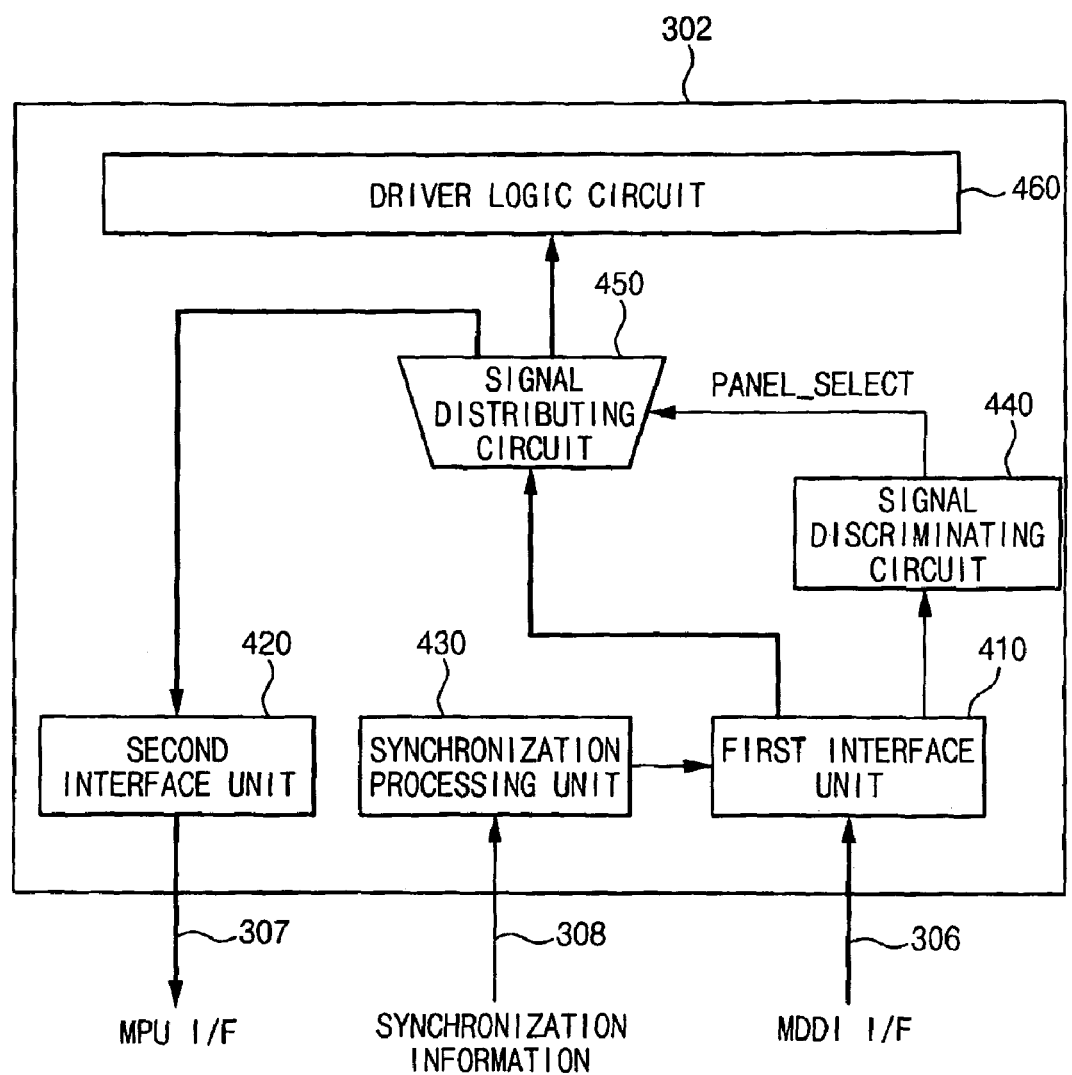
FIG. 4 is a block diagram illustrating the first display driving circuit of FIG. 3 according to an exemplary embodiment of the present invention.

FIG. 4 is a block diagram illustrating the first display driving circuit of FIG. 3, according to an exemplary embodiment of the present invention.

Referring to FIG. 4, the first display driving circuit 302 includes a first interface unit 410, a second interface unit 420 and a synchronization processing unit 430. The first interface unit 410 receives the first and the second video signals that are transmitted through the MDDI interface link represented by signal line 306. The second interface unit 420 transmits the second video signal via the MPU interface link represented by signal line 307 to an external display device.

In an exemplary embodiment of the present invention, the first interface unit 410 performs functions of an MDDI client according to a standard based on MDDI. The first interface unit 410 decodes the MDDI type packets to output the decoded signals. The MDDI type packets include the first and the second video signals. The MDDI type packets include pixel data and control signals. The first interface unit 410 may include logic circuits for performing functions different from the functions of the MDDI client according to the MDDI standard.

Table 1 shows examples of the decoded signals that are decoded by the first interface unit 410. The decoded signals of table 1 may be required for driving the first and the second display panels 301 and 303. However, other decoded signals may be included in a standard based on MDDI. Some of the decoded signals of table 1 may not be required for driving the first and the second display panels 201 and 203.

exemplary embodiment of the present invention, the driver logic circuit 460 drives the first display panel based on the first video signal. The second video signal outputted from the signal distributing circuit 450 is inputted to the second interface unit 420. The panel select signal may have logic level "1" or "0" when the signal discriminating circuit 440 discriminates only two video signals. For example, the panel select signal of "1" may represent the second video signal, and the panel select signal of "0" may represent the first video signal. The signal distributing circuit 450 provides the signals outputted from the first interface unit 410 to the driver logic circuit 460 when the panel select signal has a value of "0," and provides the signals outputted from the first interface unit 410 to the second interface unit 420 when the panel select signal has a value of "1".

The signal distributing circuit 450 may include a plurality of demultiplexers. The signal distributing circuit 450 may receive, one or more of the signals FWD_PIXEL_DATA, FWD_REG_DATA, FWD_REG_DATA, FWD_REG_PARAMS_VALID, FWD_REG_START_ADDR, FWD_

TABLE 1

| Decoded Signals | Description | Number of Bits |
| --- | --- | --- |
| MDDI_BYTE_CLK | A reference clock | |
| FWD_VIDEO_PARAMS_VALID | Having "1" when the MDDI packet is video stream packet and the parameter field of the MDDI packet shows no CRC error | 1 |
| FWD_PIXEL_DATA | One video pixel value, that is, mapped onto pixel data block of video stream packet | 24 |
| PIXEL_DATA_WR_ENA | A signal having a period of one pixel data that have "1" during a half period and "0" during the other half period. | 1 |
| FWD_REG_START_ADDR | A register address value of a register access packet | 32 |
| FWD_REG_PARAMS_VALID | Having "1" when the MDDI packet is the register access packet and the parameter field of the MDDI packet shows no CRC error | 1 |
| FWD_REG_DATA | A parameter of a register data list register of the register access packet | 32 (some of 32 bits may be used depending on example embodiments) |
| REG_DATA_WR_ENA | A signal having a period of one register data that have "1" during a half period and "0" during the other half period. | 1 |

The signal discriminating circuit 440 discriminates whether the signals outputted from the first interface unit 410 correspond to the first video signal for driving the first display panel 301 or the second video signal for driving the second display panel 303 based on some of the decoded signals of the first interface unit 410. The signal discriminating circuit 440 generates a panel select signal PANEL_SELECT based on the discrimination result. The first display panel 301 will be described later in this disclosure with reference to FIG. 5.

The signal distributing circuit 450 divides the signals outputted from the first interface unit 410 into the first video signal and the second video signal based on the panel select signal PANEL_SELECT of the signal discriminating circuit 440. The first video signal outputted from the signal distributing circuit 450 is inputted to the driver logic circuit 460 and may be used for driving the first display panel 301. In an VIDEO_PARAMS_VALID, and PIXEL_DATA_WR_ENA which are outputted from the first interface unit 410.

In an exemplary embodiment of the present invention, the signal distributing circuit 450 provides the FWD_PIXEL_DATA, FWD_REG_DATA, FWD_REG_PARAMS_VALID, FWD_REG_START_ADDR, FWD_VIDEO_PARAMS_VALID, and PIXEL_DATA_WR_ENA to the driver logic circuit 460 when the panel select signal has a value of "0". The signals provided to the driver logic circuit 460 may correspond to the first video signal.

In an exemplary embodiment of the present invention, the signal distributing circuit 450 provides the signals FWD_PIXEL_DATA, FWD_REG_DATA, FWD_REG_PARAMS_VALID, FWD_REG_START_ADDR, FWD_VIDEO_PARAMS_VALID, and PIXEL_DATA_WR_ENA to the second interface unit 420 when the panel select signal has a value of "1". The signals provided to the second interface unit 420 may correspond to the second video signal.

In an exemplary embodiment of the present invention, the driver logic circuit 460 drives the first display panel 301 of FIG. 3. The driver logic circuit 460 includes a logic circuit for driving the first display panel 301, and may include a memory for temporarily storing a video frame value.

The second interface unit 420 transmits the second video signal via the MPU interface link represented by signal line 307 to the second display driving circuit 304 shown in FIG. 3. The second interface unit 420 converts the second video signal into a signal conforming to the MPU interface and outputs the signal conforming to the MPU interface to the second display driving circuit 304 via the MPU interface link represented by signal line 307.

The synchronization processing unit 430 receives the synchronization information, for example, a video synchronization signal, from the second display driving circuit 304 via the synchronization line 308. The synchronization information includes the time point when the second video signal is transmitted to the second display panel 303. Once the synchronization information is received, the synchronization processing unit 430 determines whether the host 305 is in the sleep mode by referring to the first interface unit 410. The first interface unit 410 wakes up the host 305 when the host 305 is in the sleep mode. When the synchronization processing unit 430 receives the synchronization information, the synchronization processing unit 430 sets a synchronization register value SREQ_INT, and the host 305 may transmit the second video signal. A synchronization register may be included in the first interface unit 410. In this case, the first interface unit 410 may include the synchronization register and a logic circuit for processing the synchronization register. The synchronization register may be implemented in the driver logic circuit 460. The host 305 checks the synchronization register value SREQ_INT when the host 305 is waked in response to the wake up signal. The host 305 transmits the second video signal when the synchronization register value SREQ_INT represents the transmission of the synchronization information.

Figure 5:
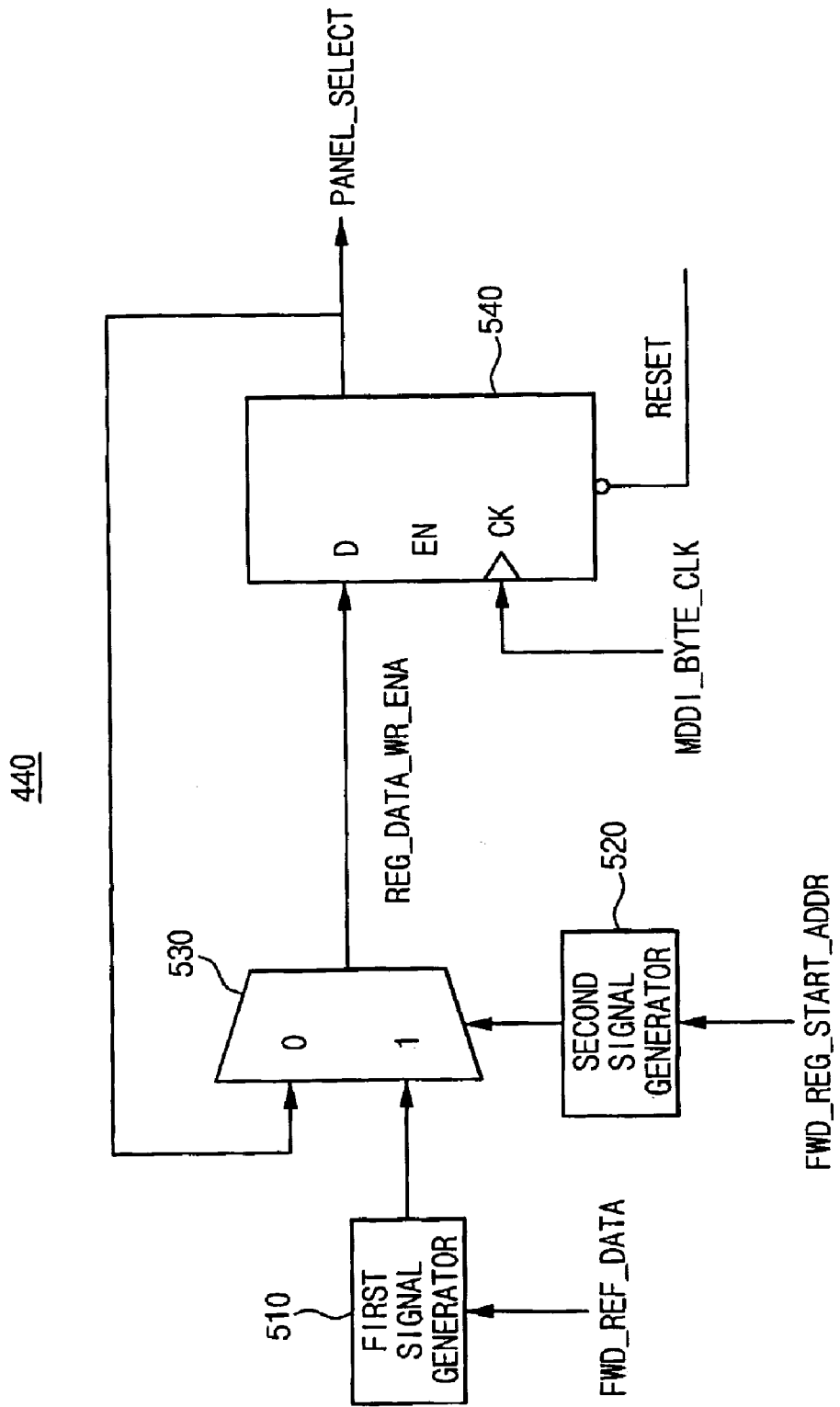
FIG. 5 is a block diagram illustrating the signal discriminating circuit of FIG. 4, according to an exemplary embodiment of the present invention.

FIG. 5 is a block diagram illustrating the signal discriminating circuit of FIG. 4, according to an exemplary embodiment of the present invention.

Referring to FIG. 5, the signal discriminating circuit 440 includes a first signal generator 510, a second signal generator 520, a multiplexer 530 and a D flip flop 540.

The first signal generator 510 outputs "1" signal to a first input terminal of the multiplexer 530 when the signal FWD_REG_DATA has a value of "1" and outputs "0" signal when the signal FWD_REG_DATA has a value of "0". The second signal generator 520 outputs "1" signal to a selection terminal of the multiplexer 530 when the signal FWD_REG_START_ADDR has a value of "80h" and outputs "0" signal to the selection terminal of the multiplexer 530 when the signal FWD_REG_START_ADDR does not have the value of "80h".

The multiplexer 530 selects one of a feedback signal (i.e. the signal PANEL_SELECT) and the output signal of the first signal generator 510 in response to the output signal of the second signal generator 520, and outputs the selected one to an input terminal D of the D flip flop 540.

The clock signal MDDI_BYTE_CLK may be inputted to a clock terminal CK of the D flip flop 540. The signal REG_DATA_WR_ENA may be inputted to an enable terminal EN of the D flip flop 540. The D flip flop 540 is reset in response to a predetermined reset signal RESET.

Thus, the D flip flop 540 generates the signal PANEL_SELECT having a value of "1" in response to a rising edge of the signal MDDI_BYTE_CLK in the case when the signal REG_DATA_WR_ENA has "1," the signal FWD_REG_START_ADDR has the predetermined value such as the value of "80h," and the signal FWD_REG_DATA has the predetermined value such as the value of "1," and, otherwise, the D flip flop 404 generates the signal PANEL_SELECT having a value of "0" in response to the rising edge of the signal MDDI_BYTE_CLK.

The D flip flop 540 maintains previous value of the signal PANEL_SELECT when the signal MDDI_BYTE_CLK is not at the rising edge or when the signal REG_DATA_WR_ENA does not have "1" and the signal MDDI_BYTE_CLK is at the rising edge.

It is to be understood that the signal discriminating circuit 440 for generating the panel select signal may be embodied in various configurations.

Figure 6:
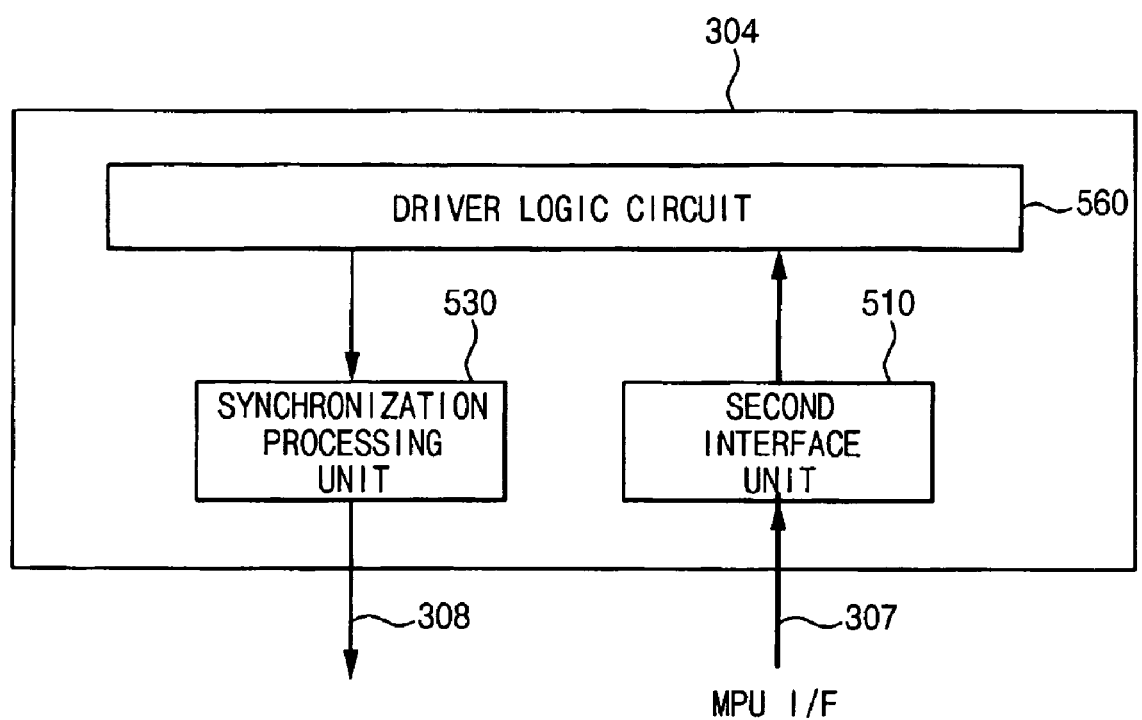
FIG. 6 is a block diagram illustrating the second display driving circuit of FIG. 3, according to an exemplary embodiment of the present invention.

FIG. 6 is a block diagram illustrating the second display driving circuit of FIG. 3, according to an exemplary embodiment of the present invention.

Referring to FIG. 6, the second display driving circuit 304 includes a second interface unit 510 that receives the second video signal from another display device via the MPU interface link represented by signal line 307. The second display driving circuit 304 provides the second video signal to the driver logic circuit 560.

The driver logic circuit 560 drives the second display panel 303 of FIG. 3 based on the second video signal. The driver logic circuit 560 includes a logic circuit for driving the second display panel 303 and may include a memory for temporarily storing video frame value.

The synchronization processing unit 530 transmits the synchronization information via the synchronization line 308 so that the host 305 may transmit the second video signal for a new video frame.

Figure 7:
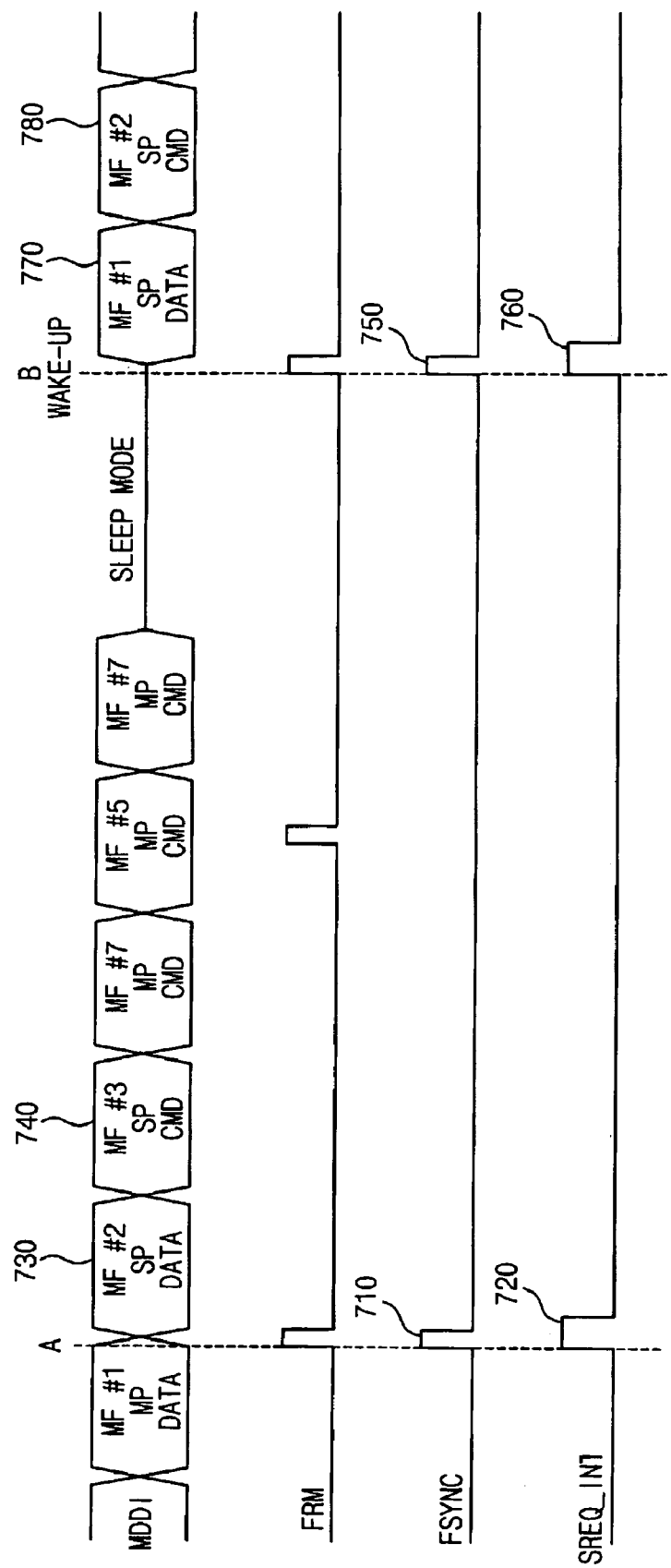
FIG. 7 is a timing diagram illustrating operations of a display system according to an exemplary embodiment of the present invention.

FIG. 7 is a timing diagram illustrating operations of the display system according to an exemplary embodiment of the present invention.

A signal FRM is a video frame synchronization signal of the second display device, and the second display device displays a video frame in response to the signal FRM. A pulse (i.e., high state) 710 of a signal FSYNC corresponds to the synchronization information that is transmitted to the first display device by the second display device, and becomes the high status 710 when the FRM signal has a high status. The signal FSYNC may have a high status every video frame, or as shown in FIG. 7, may have a high status every two video frames. The memory that temporarily stores the video frame of the second display device may be updated based on the signal FSYNC. For example, the second display device updates the memory after displaying two video frames in case the signal FSYNC has a high status every two video frames.

The signal SREQ_INT is a signal from a synchronization register in the first display device. The synchronization register may transfer the second video signal when the signal SREQ_INT has a high status 610. The synchronization register is set to have a value that allows for the host to transfer the second video signal when the first display device receives the signal FSYNC of a high status 710.

The host determines the value of the synchronization register before the host transfers data to the first display device. The host transfers the second video signal when the value of the synchronization register is set to have the value that allows for the host to transfer the second video signal. Hereinafter, operations of the host in a wake-up mode and in the sleep mode will be explained.

The host is in the wake-up mode when the host transfers data through the MDDI interface. When the synchronization register is set at the time point of "A," the host determines whether the synchronization register is set or not set and transmits pixel data 730 and control command 740 for the second display device to the first display device. The pixel data 730 as shown in FIG. 7 includes data constituting two video frames in the second display device. The first display device transmits the pixel data 730 and the control command 740 to the second display device. The host enters the sleep mode when the pixel data 730 and the control command 740 are transmitted to the first and the second display devices.

When the host is in the sleep mode and the first display device receives the signal FSYNC of a high status 750, the signal SREQ_INT of the first display device becomes a high status 760, and the synchronization register is set. In addition, the first display device wakes the host. When the host is waked in response to the wake-up signal, the host checks whether the synchronization register of the first display device is set or not set. The host determines whether the second display device requests video data when the synchronization register of the first display device is set, and transmits the pixel data 770 and the control command 780 for the second display device to the first display device.

Figure 8:
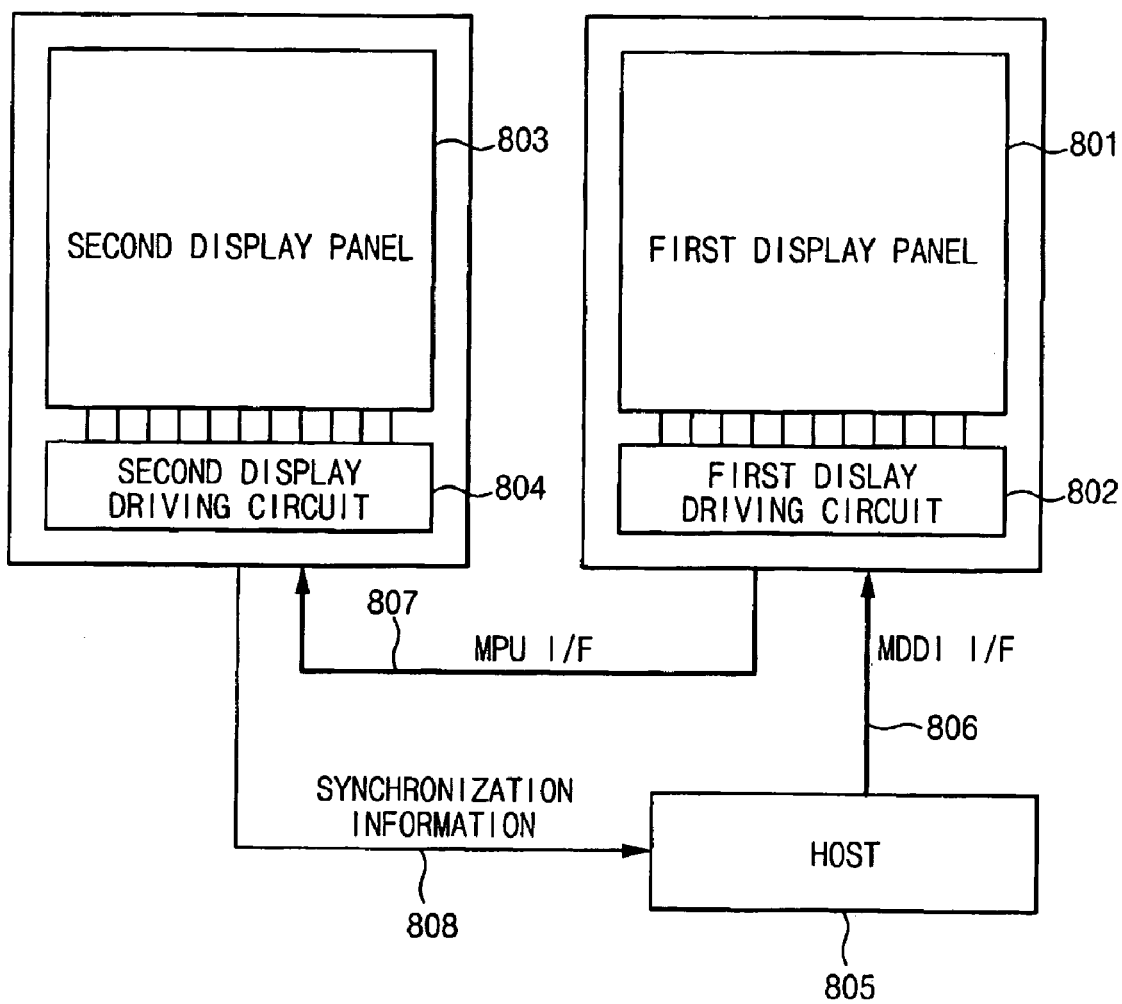
FIG. 8 is a block diagram illustrating a display system according to an exemplary embodiment of the present invention.

FIG. 8 is a block diagram illustrating a display system according to an exemplary embodiment of the present invention.

Referring to FIG. 8, the display system includes a first display panel 801, a first display driving circuit 802 for driving the first display panel 801, a second display panel 803, a second display driving circuit 804 for driving the second display panel 803, and a host 805.

The host 805 transmits the first and the second video signals through the MDDI interface link represented by signal line 806 to the first display driving circuit 802. The first display driving circuit 802 discriminates the first video signal from the second video signal, and drives the first display panel 801 based on the first video signal. The first display panel 801 displays the video image that is transferred thereto based on the first video signal. The first display driving circuit 802 transmits the second video signal through the MPU interface link represented by signal line 807 to the second display driving circuit 804.

The second display driving circuit 804 drives the second display panel 803 based on the second video signal. The second display panel 803 displays video image transmitted based on the second video signal. The second display driving circuit 804 transmits a synchronization signal to the host 805 to inform a time point when the second video signal is transmitted to the second display panel 803. The synchronization signal may be transferred via a synchronization line 808.

The host transmits the second video signal to the first display driving circuit 802 when the host receives the synchronization signal. The host checks whether the first display driving circuit 802 is in the sleep mode when the host 805 receives the synchronization signal. When the first display driving circuit 802 is in the sleep mode, the host wakes up the first display driving circuit 802 and then transmits the second video signal to the first display driving circuit 802.

Figure 9:
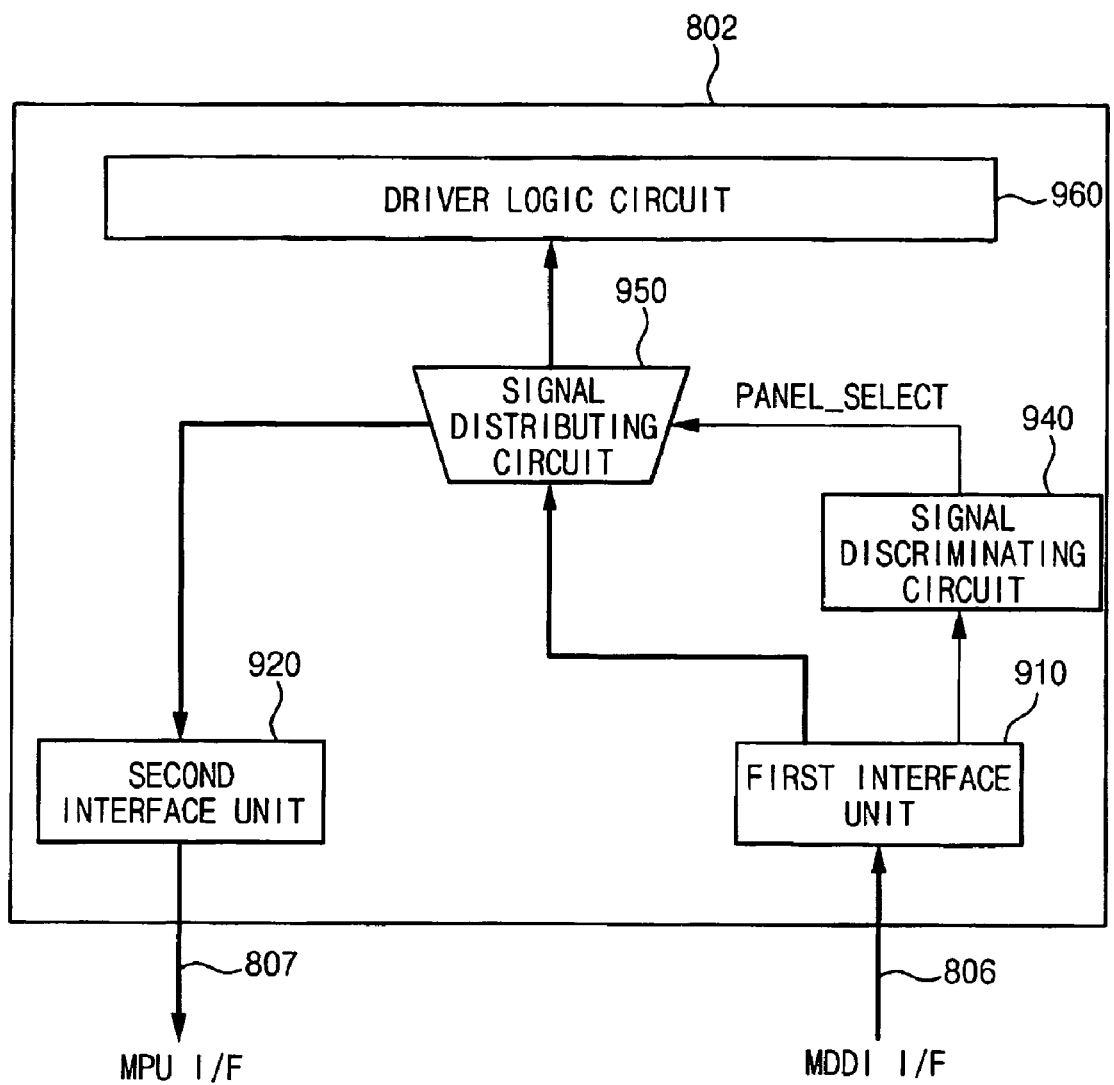
FIG. 9 is a block diagram illustrating the display driving circuit of FIG. 8, according to an exemplary embodiment of the present invention.

FIG. 9 is a block diagram illustrating a display driving circuit as shown in FIG. 8, according to an exemplary embodiment of the present invention.

Referring to FIG. 9, the first display driving circuit 802 includes a first interface unit 910 and a second interface unit 920. The first interface unit 910 receives the first and the second video signals that are transmitted through the MDDI interface link represented by signal line 806. The second interface unit 820 transmits the second video signal via the MPU interface link represented by signal line 807 to an external display device. In addition, the first display driving circuit 802 includes a signal discriminating circuit 940, a signal distributing circuit 950, and a driver logic circuit 960. The signal discriminating circuit 940 discriminates whether the signals outputted from the first interface unit 910 correspond to the first video signal or the second video signal. The signal distributing circuit 950 divides the signals outputted from the first interface unit 910 into the first video signal and the second video signal. The driver logic circuit 960 drives the first display panel 801 based on the first video signal. Operations of the first interface unit 910, the second interface unit 920, the signal discriminating circuit 940, the signal distributing circuit 950 and the driver logic circuit 960 are substantially the same as those of the corresponding elements of the first display driving circuit 302 described in connection with FIG. 4, and further description will be omitted in the interests of clarity and simplicity. However, the first display driving circuit 802 differs from the first display driving circuit 302 in that the first display driving circuit 802 does not include the synchronization processing unit.

Although the above-described display systems according to exemplary embodiments of the present invention include two display devices, it is to be understood that the display systems described in connection with FIGS. 1 through 9 may include three or more display devices.

Figure 10:
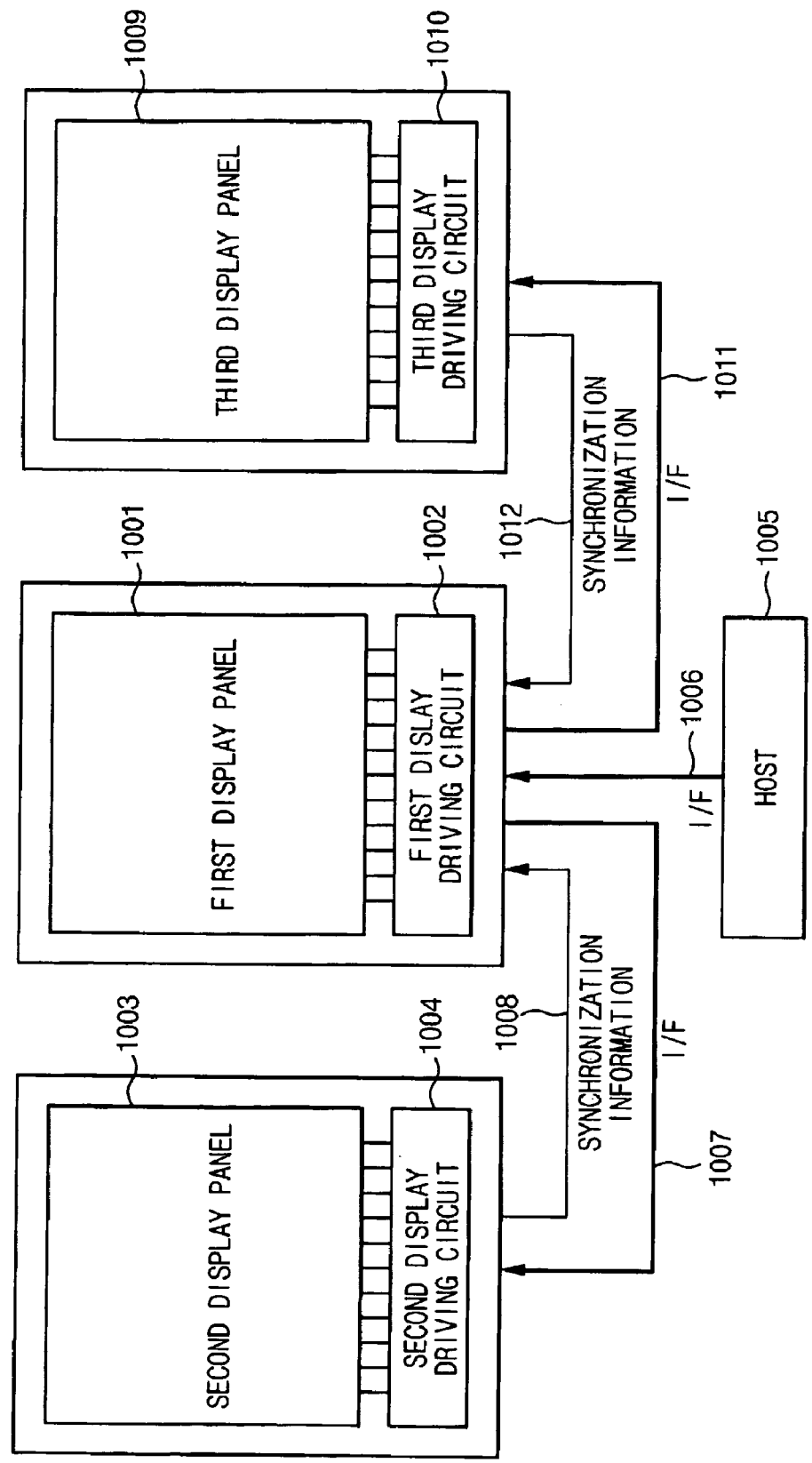
FIG. 10 is a block diagram illustrating a display system according to an exemplary embodiment of the present invention.

FIG. 10 is a block diagram illustrating a display system according to an exemplary embodiment of the present invention.

Referring to FIG. 10, the display system includes a first display panel 1001, a first display driving circuit 1002, a second display panel 1003, a second display driving circuit 1004, a third display panel 1009, a third display driving circuit 1010 and a host 1005. The host 1005 provides video signals, for example, a first video signal, a second video signal and a third video signal, for three display devices. As shown in FIG. 10, the host 1005 transmits the first, second and third video signals through a first interface represented by signal line 1006 to the first display driving circuit 1002.

The first display driving circuit 1002 discriminates the first video signal, the second video signal and the third video signal, and drives the first display panel 1001 based on the first video signal. The first display driving circuit 1002 transmits the second video signal through the second interface represented by signal line 1007 to the second display driving circuit 1004, and transmits the third video signal through the third interface represented by signal line 1011 to the third display driving circuit 1010.

The second and the third display driving circuits 1004 and 1010 respectively drive the second and the third display panels 1003 and 1009 based on the second and third video signals. The second and the third display driving circuits 1004 and 1010 transmit a synchronization information via the synchronization lines 1008 and 1012, respectively, to the first display driving circuit 1002 so that the host 1005 may transmit the second and the third video signals in an appropriate time point to the second and the third display driving circuits 1004 and 1010, respectively.

Figure 11:
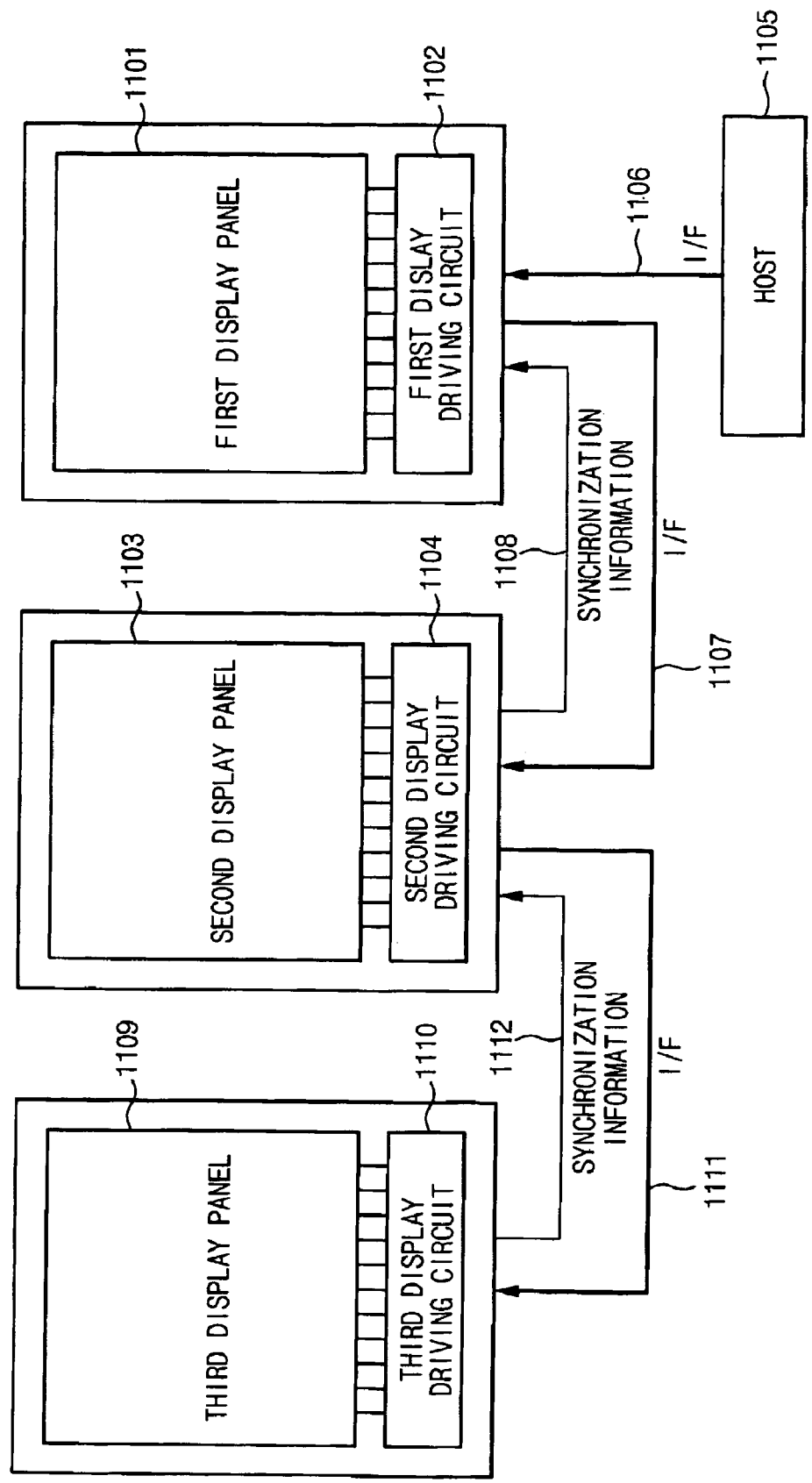
FIG. 11 is a block diagram illustrating a display system according to an exemplary embodiment of the present invention.

FIG. 11 is a block diagram illustrating a display system according to an exemplary embodiment of the present invention.

Referring to FIG. 11, the display system includes a first display panel 1101, a first display driving circuit 1102, a second display panel 1103, a second display driving circuit 1104, a third display panel 1109, a third display driving circuit 1110 and a host 1105. The host 1105 provides video signals, for example, a first video signal, a second video signal and a third video signal, for three display devices. As shown in FIG. 11, the host 1105 transmits the first, second and third video signals through a first interface represented by signal line 1106 to the first display driving circuit 1102.

The first display driving circuit 1102 discriminates the first video signal, the second video signal and the third video signal, and drives the first display panel 1101 based on the first video signal. The first display driving circuit 1102 transmits the second video signal and the third video signal through a second interface represented by signal line 1108 to the second display driving circuit 1104. The first display driving circuit 1102 drives the first display panel 1101 and functions as a host for both the second and the third display driving circuits 1104 and 1110.

The second display driving circuit 1104 discriminates the second video signal from the third video signal, and drives the second display panel 1103 based on the second video signal. The second display driving circuit 1104 transmits the third video signal through a third interface represented by signal line 1111 to the third display driving circuit 1110. The third display driving circuit 1110 drives the third display panel 1109 based on the third video signal.

The second display driving circuit 1104 transmits synchronization information to the first display driving circuit 1102 via a synchronization line 1108, so that the host 1105 may transmit the second video signal in an appropriate time point to the second display driving circuit 1104. The third display driving circuit 1110 transmits a synchronization information to the second display driving circuit 1104 via a synchronization line 1112 so that the host 1105 may transmit the third video signal in an appropriate time point to the third display driving circuit 1110. The second display driving circuit 1104 transmits the received synchronization information of the third display driving circuit 1110 to the first display driving circuit 1102. However, the third display driving circuit 1110 may transmit the synchronization information directly to the first display driving circuit 1102.

A display device in accordance with an exemplary embodiment of the present invention transmits the synchronization signal directly to the host.

Figure 12:
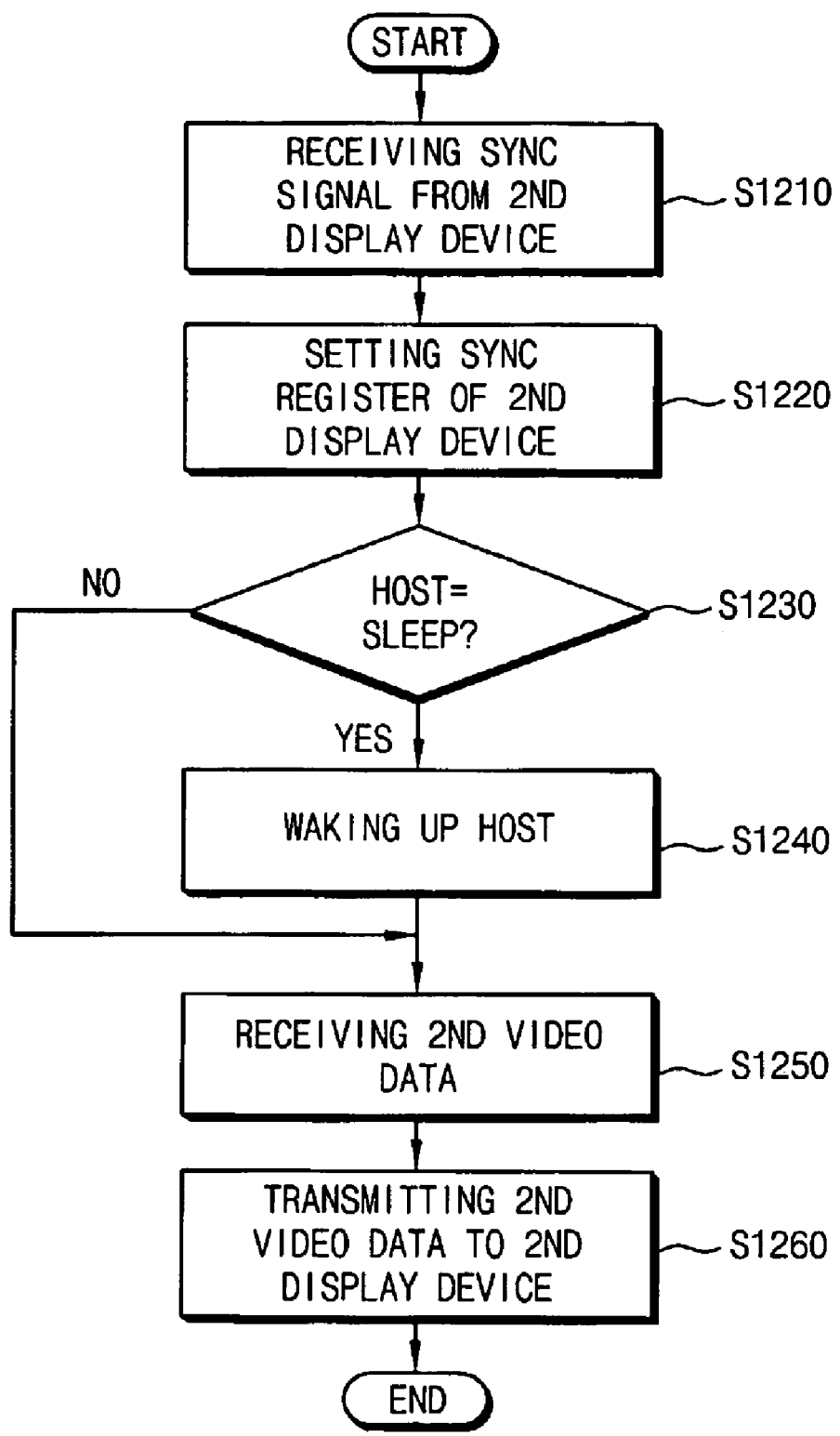
FIG. 12 is a flow chart illustrating operations of the first display driving circuit in the display system described in connection with FIG. 3, according to an exemplary embodiment of the present invention.
Figure 13:
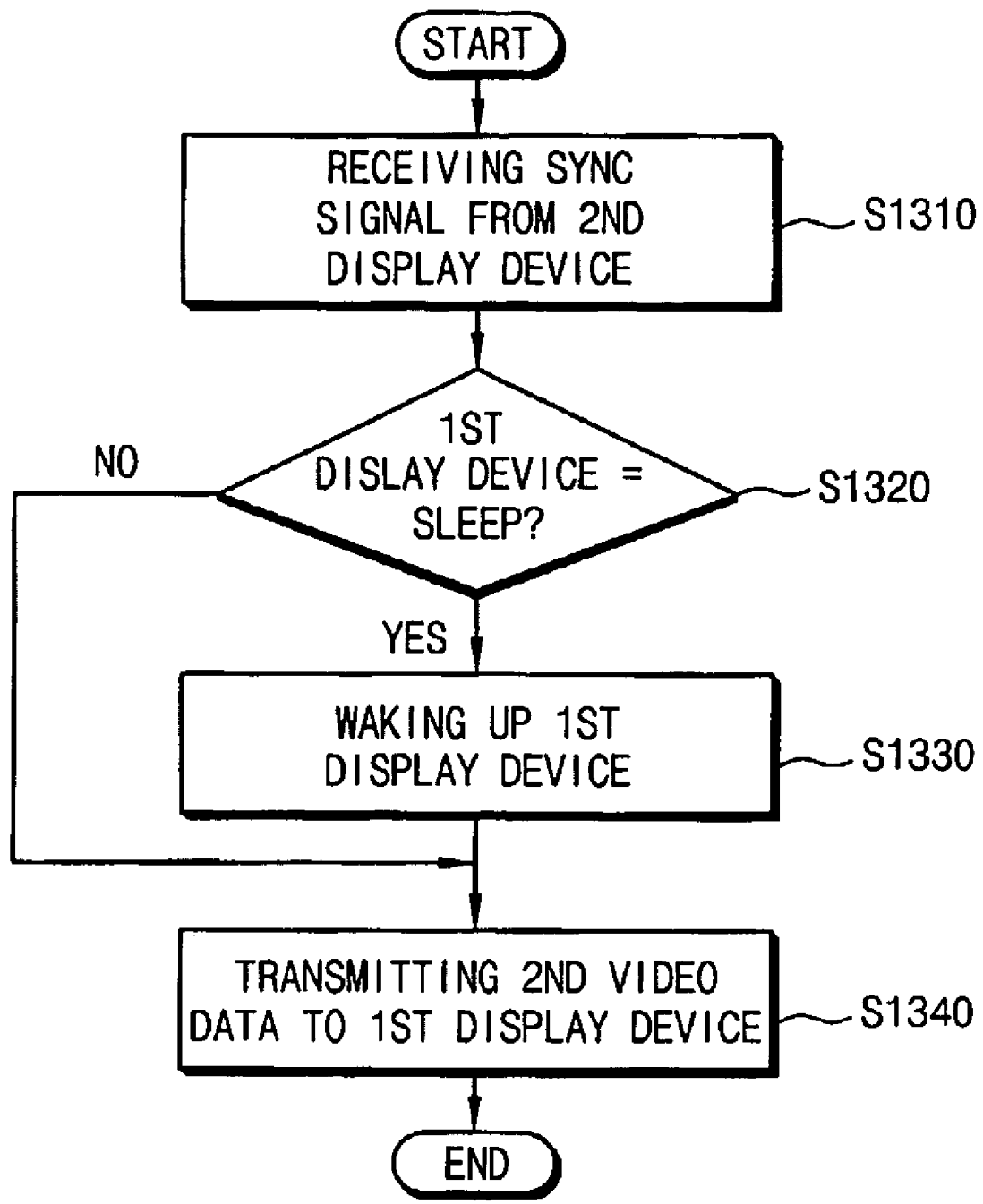
FIG. 13 is a flow chart illustrating operations of the host in the display system described in connection with FIG. 8, according to an exemplary embodiment of the present invention.

FIG. 12 is a flow chart showing operations of the first display driving circuit in the display system described in connection with FIG. 3, according to an exemplary embodiment of the present invention. FIG. 13 is a flow chart showing operations of the host in the display system described in connection with FIG. 8, according to an exemplary embodiment of the present invention.

Referring to FIC 12, the first display device receives the synchronization signal, that is, synchronization information, transmitted from the second display driving circuit in step S1210. The first display device sets a value of the synchronization register so that the host may transfer the second video signal in step S1220. The first display device checks whether the host is in the sleep mode in step S1230. The first display device wakes up the host in step S1240 when the host is in the sleep mode.

The host checks the value of the synchronization register to transmit the video signal to the first display device before the host transmits the video signal to the first display device. The host determines that video transmission request is activated when the host is waked up in response to the wake-up signal, and checks the value of the synchronization register. When the value of the synchronization register is set, the host transmits the second video signal to the first display device.

The first display device receives the second video signal in step S1250 and transmits the second video signal to the second display device in step S1260.

Referring to FIG. 13, the host receives the synchronization signal transmitted from the second display driving circuit in step S1310. The host checks whether the first display device is in a sleep mode in step S1320. The host wakes up the first display device in step S1330 when the first display device is in the sleep mode.

When the first display device is in a wake-up mode or enters the wake-up mode, the host transmits the second video signal to the first display device in step S1340. The first display device receives the second video signal and transmits the second video signal to the second display device.

According to above described display driving system, the complexity of the wiring in the display system having a plurality of display panels may be reduced.

In addition, the host is able to receive the synchronization information for the respective display panel, thereby effectually reducing the tearing effect that may occur in a display panel, such as a sub-display panel, of the display system.

Although the exemplary embodiments of the present invention have been described in detail with reference to the accompanying drawings for the purpose of illustration, it should be understood that the inventive processes and apparatus should not be construed as limited thereby. It will be readily apparent to those of reasonable skill in the art that various modifications to the foregoing exemplary embodiments may be made without departing from the scope of the invention as defined by the appended claims, with equivalents of the claims to be included therein.

What is claimed is:

1. A display system comprising:
   a first display device comprising a first display panel and a first display driving circuit;
   a second display device comprising a second display panel and a second display driving circuit; and
   a host that provides a first video signal for the first display device and a second video signal for the second display device through a first interface,
   wherein the first display device receives the first and the second video signals from the host, displays a first video image based on the first video signal, and provides the second video signal through a second interface to the second display driving circuit,
   wherein the second display driving circuit transmits a synchronization signal to the first display device for informing the host of a time point when the second video signal is transmitted to the display driving circuit of the second display panel, and displays a second video image based on the second video signal, and
   wherein the host receives the synchronization signal from the first display device, and provides the second video signal in response to the synchronization signal.

2. A method of driving a plurality of display devices, comprising:
   receiving first and second video signals, which are transmitted from a host through a first interface to a first display device;
   discriminating the first video signal from the second video signal by the first display device;
   displaying a first video image using the first display device based on the first video signal;
   transmitting the second video signal from the first display device through a second interface to a display driving circuit of a second display device;
   displaying a second video image using the second display device based on the second video signal; and
   transmitting a synchronization signal from the display driving circuit of the second display device to the first display device for informing the host of a time point when the second video signal is transmitted to the display driving circuit of the second display panel,
   wherein the second video signal transmitted from the host is provided to the first display device in response to the synchronization signal.

* * * * *